US008665908B1

(12) United States Patent
Zhang et al.

(10) Patent No.: US 8,665,908 B1
(45) Date of Patent: Mar. 4, 2014

(54) SIGNALING GUARD INTERVAL CAPABILITY IN A COMMUNICATION SYSTEM

(75) Inventors: Hongyuan Zhang, Fremont, CA (US); Sudhir Srinivasa, Sunnyvale, CA (US); Yong Liu, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 117 days.

(21) Appl. No.: 13/102,727

(22) Filed: May 6, 2011

Related U.S. Application Data

(60) Provisional application No. 61/333,690, filed on May 11, 2010.

(51) Int. Cl.
*H04J 3/24* (2006.01)
*H04Q 11/04* (2006.01)

(52) U.S. Cl.
CPC .............................. *H04Q 11/0478* (2013.01)
USPC .......................................... 370/474; 370/338

(58) Field of Classification Search
USPC .................................. 370/252, 328–338, 474
See application file for complete search history.

(56) References Cited

U.S. PATENT DOCUMENTS

| 2010/0091673 | A1* | 4/2010 | Sawai et al. | 370/252 |
| 2010/0260159 | A1 | 10/2010 | Zhang et al. | |
| 2011/0032875 | A1* | 2/2011 | Erceg et al. | 370/328 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* (1999).

S. A. Mujtaba, "IEEE P802.11—Wireless LANs, TGn Sync Proposal Technical Specification," *The Institute of Electrical and Electronics Engineers, Inc.,* doc.: IEEE 802.11—04/0889r6, May 2005.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher—speed Physical Layer (PHY) extension in the 2.4 GHz band—Corrigendum 1," *The Institute of Electrical and Electronics Engineers, Inc.,* Nov. 7, 2001.

(Continued)

*Primary Examiner* — Kan Yuen

(57) ABSTRACT

In a wireless network in which communication devices are configured to use a first guard interval between symbols or a second guard interval between symbols, wherein the first guard interval has a length shorter than a length of the second guard interval, a field is generated to indicate a set of one or more modulation and coding schemes (MCSs) supported by a first device in the wireless network and to indicate whether each of the one or more MCSs is supported when using the first guard interval. A data unit that includes the field is generated and transmitted to a second device in the wireless network.

4 Claims, 6 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

U.S. Appl. No. 12/751,484, filed Mar. 31, 2010—Zhang et al.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

van Nee, et al. "The 802.11n MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," *Institute of Electrical and Electronics Engineers*, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

\* cited by examiner

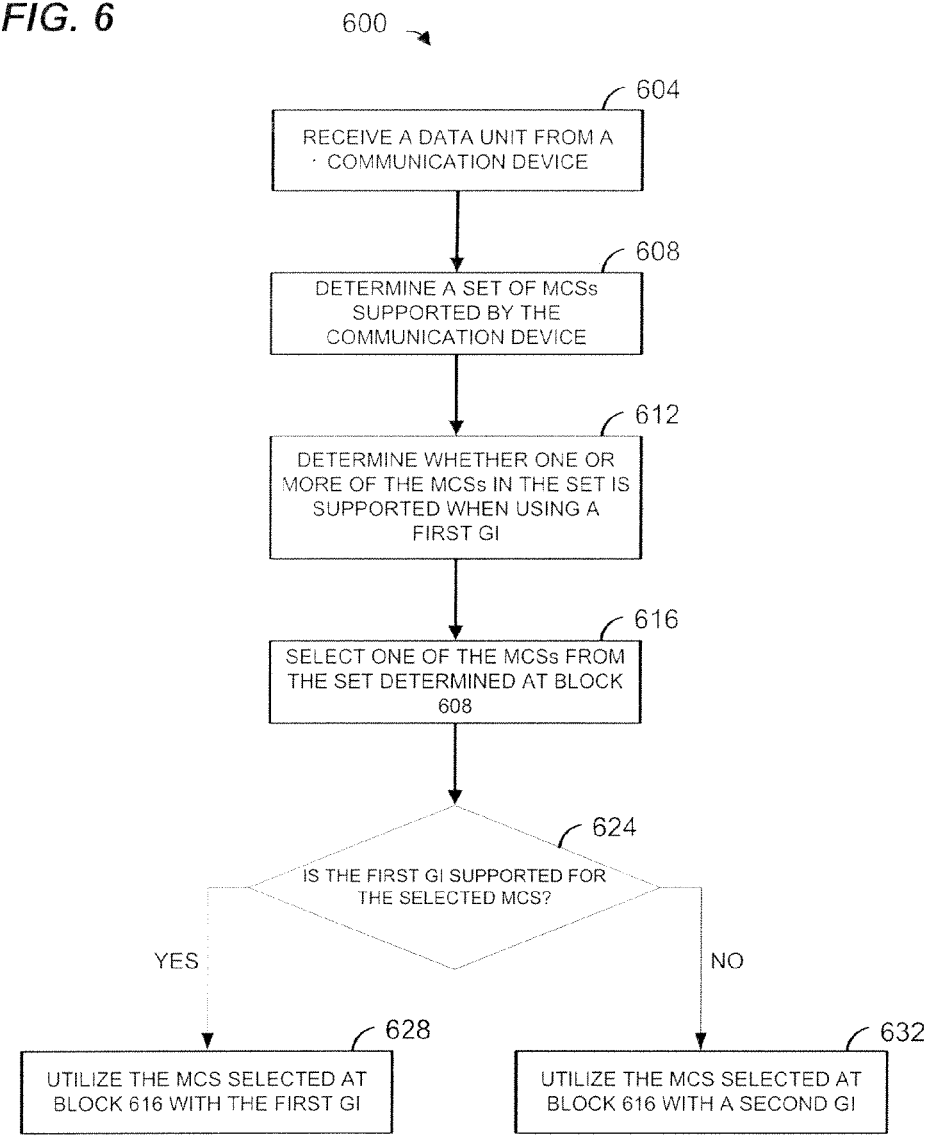

SIGNALING GUARD INTERVAL CAPABILITY IN A COMMUNICATION SYSTEM

CROSS-REFERENCES TO RELATED APPLICATIONS

This disclosure claims the benefit of U.S. Provisional Patent Application No. 61/333,690, filed on May 11, 2010, which is hereby incorporated by reference herein in its entirety.

FIELD OF THE DISCLOSURE

The present disclosure relates generally to communication networks and, more particularly, to communicating device capabilities between devices in a wireless network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for generating a data unit for transmission in a wireless network is disclosed. Communication devices in the wireless network are configured to use a first guard interval between symbols or a second guard interval between symbols, wherein the first guard interval has a length shorter than a length of the second guard interval. The method includes generating a field to indicate a set of one or more modulation and coding schemes (MCSs) supported by a first device in the wireless network and to indicate whether each of the one or more MCSs is supported when using the first guard interval. The method also includes generating a data unit to include the field and causing the data unit to be transmitted to a second device in the wireless network.

In another embodiment, an apparatus for use in a wireless network is disclosed. The wireless network is configured to use a first guard interval between symbols or a second guard interval between symbols, wherein the first guard interval has a length shorter than a length of the second guard interval. The apparatus comprises a wireless network interface configured to generate a field to indicate a set of one or more modulation and coding schemes (MCSs) supported by the wireless network interface and to indicate whether each of the one or more MCSs is supported when using the first guard interval. The wireless network interface is further configured to generate a data unit to include the field and cause the data unit to be transmitted to another device in the wireless network.

In yet another embodiment, a method for determining capabilities of a communication device in a wireless network is disclosed. The wireless network is configured to use a first guard interval between symbols or a second guard interval between symbols, wherein the first guard interval has a length shorter than a length of the second guard interval. The method includes analyzing a field in a data unit received from a communication device to determine a set of one or more modulation and coding schemes (MCSs) supported by the communication device and to determine whether one or more MCSs in the set of one or more MCSs is supported by the communication device when using the first guard interval. Additionally, the method includes utilizing i) one of the MCSs in the set of one or more MCSs and ii) the first guard interval a) when communicating with the communication device and b) when it is determined that the one MCS is supported by the communication device when using the first guard interval.

In still another embodiment, an apparatus for use in a wireless network is disclosed. The wireless network is configured to use a first guard interval between symbols or a second guard interval between symbols, wherein the first guard interval has a length shorter than a length of the second guard interval. The apparatus comprises a wireless network interface configured to analyze a field in a data unit received from a communication device to determine a set of one or more modulation and coding schemes (MCSs) supported by the communication device and to determine whether one or more MCSs in the set of one or more MCSs is supported by the communication device when using the first guard interval. The wireless network interface is further configured to utilize i) one of the MCSs in the set of one or more MCSs and ii) the first guard interval when communicating with the communication device and when it is determined that the one MCS is supported by the communication device when using the first guard interval.

BRIEF DESCRIPTION OF THE DRAWINGS

FIG. 6 is a flow diagram of an example method 600 for determining capabilities of a communication device, according to an embodiment.

DETAILED DESCRIPTION

In embodiments described below, a wireless network device such as an access point (AP) of a wireless local area network (WLAN) transmits data streams to one or more client stations. According to an embodiment, symbols transmitted by the AP include guard intervals to prevent or minimize intersymbol interference at the receiver caused by multipath propagation in the communication channel. The length of the guard interval needed to mitigate interference generally depends on the delay spread of the particular channel being utilized. Consequently, in some embodiments and/or scenarios, the guard interval utilized by the AP is a long guard interval (LGI), while in other embodiments and/or scenarios, the guard intervals utilized is a short guard interval (SGI). The short guard interval has an advantage of reducing idle time between symbols and thus increasing transmission data rate. However, in some situations, the increased data rate associated with the shorter guard interval is not supported by a particular client station, and in these situations the longer guard interval needs to be utilized even if the delay spread of the channel allows for a shorter guard interval to be used. Therefore, a client station, in establishing communication with an AP, communicates to the AP data rate capabilities of the client station in various scenarios and/or embodiments. For example, in an embodiment, the client station communicates to the AP information that allows the AP to determine if a short guard interval is supported by the client station for a particular channel bandwidth and/or a particular modulation and coding scheme (MCS). In an embodiment, the AP utilizes this information to determine the proper guard interval based on the bandwidth and MCS being utilized for communicating with the client station. Similarly, the AP communicates to the client station data rate capabilities of the AP in other various scenarios and/or embodiments. Additionally, a first client station communicates to a second client station data rate capabilities of the first client station in other various scenarios and/or embodiments.

Figure 1:
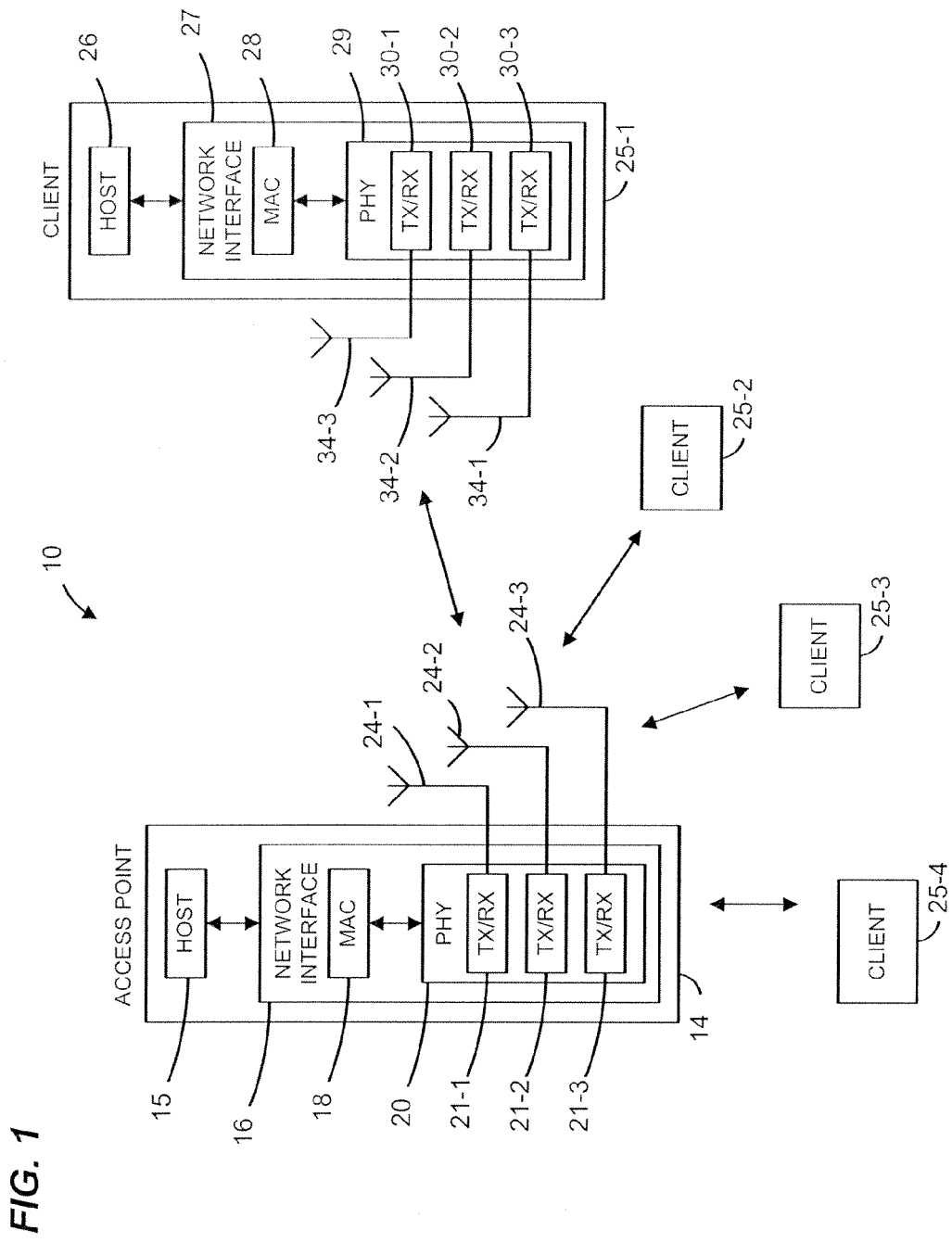
FIG. 1 is a block diagram of an example wireless local area network (WLAN) that utilizes techniques for communicating capabilities between devices, according to an embodiment.

FIG. 1 is a block diagram of an example embodiment of a wireless local area network (WLAN) 10 that utilizes techniques described herein for communicating capabilities among devices, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11ac Standard, now in the process of being standardized). The first communication protocol is also referred to herein as a very high throughput (VHT) protocol. In another embodiment, the MAC processing unit 18 and the PHY processing unit 20 are also configured to operate according to at least a second communication protocol (e.g., the IEEE 802.11n Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g. 1, 2, 4, 5, etc.) of transceivers 30 and antennas 34 in other embodiments.

In an embodiment, one or all of the client stations 25-2, 25-3 and 25-4, have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
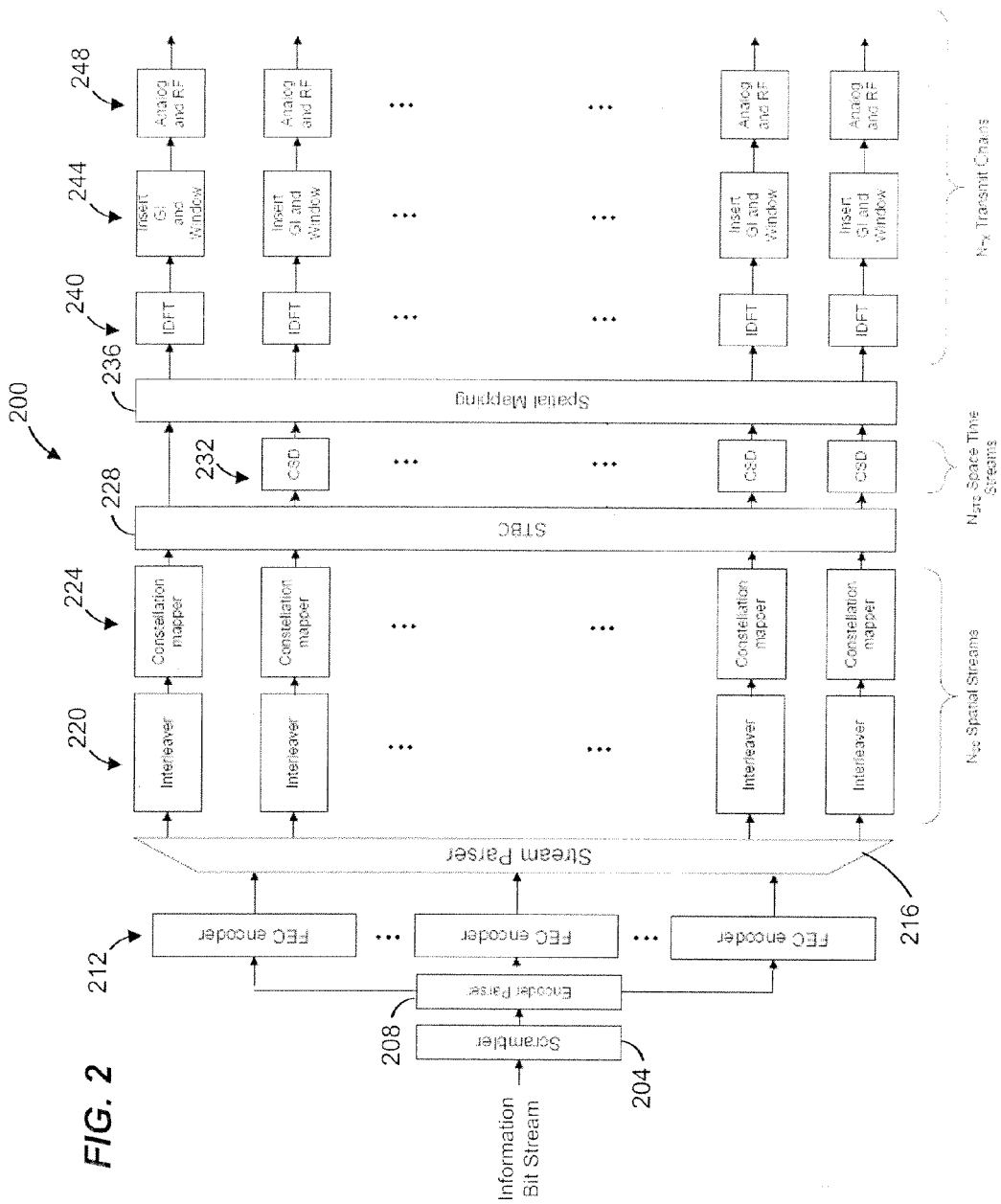
FIG. 2 is a block diagram of an example physical layer (PHY) processing unit, according to an embodiment.

FIG. 2 is a block diagram of an example PHY processing unit 200 configured to operate according to the VHT protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reduce the occurrence of long sequences of ones or zeros, according to an embodiment. In another embodiment, the scrambler 204 is replaced with a plurality of parallel scramblers located after an encoder parser 208. In this embodiment, each of the parallel scramblers has a respective output coupled to a respective one of a plurality of FEC encoders 212. The plurality of parallel scramblers operate simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Each encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In this embodiment, each FEC encoder 212 is configured to implement any of: 1) binary convolutional encoding without puncturing; 2) binary convolutional encoding with puncturing; or 3) LDPC encoding.

A stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. Also corresponding to each spatial stream, a constellation mapper 224 maps an interleaved sequence of bits to constellation points corresponding to different subcarriers of an OFDM symbol. More specifically, for each spatial stream, the constellation mapper 224 translates every bit sequence of length log2(M) into one of M constellation points. The constellation mapper 224 handles different numbers of constellation points depending on the MCS being utilized. In an embodiment, the constellation mapper 224 is a quadrature amplitude modulation (QAM) mapper that handles M=2, 4, 16, 64, 256, and 1024. In other embodiments, the constellation mapper 224 handles different modulation schemes corresponding to M equaling different subsets of at least two values from the set {2, 4, 16, 64, 256, 1024}.

In an embodiment, a space-time block coding unit 228 receives the constellation points corresponding to the one or more spatial streams and spreads the spatial streams to a greater number of space-time streams. In some embodiments, the space-time block coding unit 228 is omitted. A plurality of CSD units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 236 corresponds to a transmit chain, and each output of the spatial mapping unit 236 is operated on by an IDFT unit 240 that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral decay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios.

Figure 3:
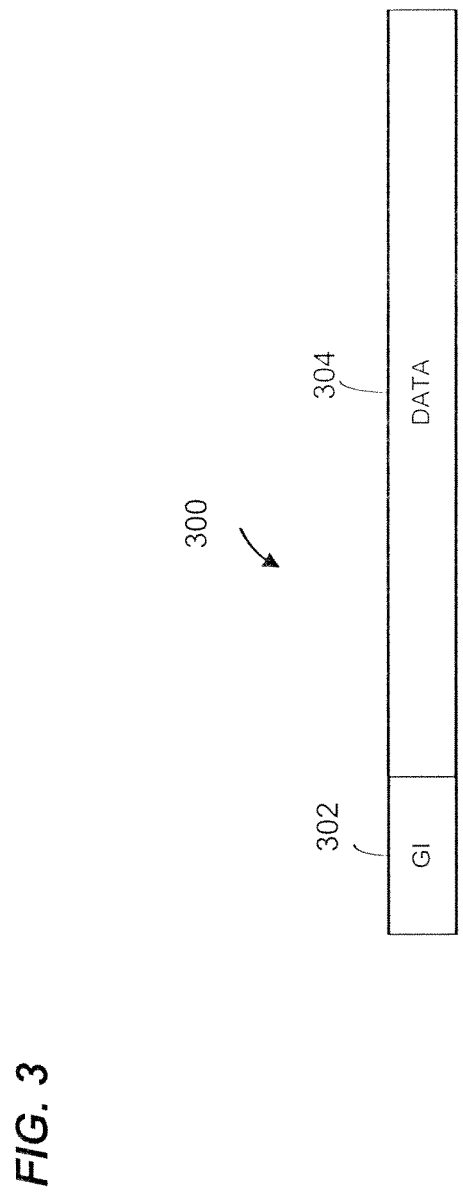
FIG. 3 is a diagram of an example orthogonal frequency division multiplexing (OFDM) symbol, according to an embodiment.

FIG. 3 is a diagram of an example OFDM symbol 300 generated by the PHY processing unit 200, according to an embodiment. The OFDM symbol 300 includes a guard interval portion 302 and a data portion 304. For example, the guard interval comprises a cyclic prefix repeating an end portion of the symbol, according to an embodiment. Further, according to one embodiment, the guard interval portion 302 is either a short guard interval or a long guard interval, depending on mode of transmission to be utilized. In an embodiment, the short guard interval (SGI) has a length of 0.4 µs, and the long guard interval (LGI) has a length of 0.8 µs guard interval. In an embodiment, the data portion 304 has a length of 3.2 µs. In other embodiments, other suitable lengths for the SGI, the LGI, and the data portion 304 are utilized. In some embodiments, the SGI has a length that is 50% of the length of the LGI. In other embodiments, the SGI has a length that is 75% or less of the length of the LGI. In other embodiments, the SGI has a length that is 50% or less of the length of the LGI.

In an embodiment, the data rate of data units processed by the PHY processing unit 200 depends on the channel bandwidth, the particular MCS being utilized, and the guard interval length. For example, in an embodiment, the channel bandwidth determines the number of data tones, and the MCS defines the constellation size, the coding rate, and the number of spatial streams utilized. In an embodiment, the guard interval length determines the total time over which a symbol is transmitted. For example, when the SGI has a length of 0.4 µs, the LGI has a length of 0.8 µs guard interval, and the data portion 304 has a length of 3.2 µs, the OFDM symbol 300 has a length of 3.6 µs when the SGI is utilized and a length of 4.0 µs when the LGI is utilized.

The number of sub-carriers (or tones) in an OFDM symbol generally depends on the bandwidth (BW) of the channel being utilized, in some embodiments. For example, an OFDM symbol for a 20 MHz channel corresponds to a size 64 IDFT and includes 64 tones, whereas an OFDM symbol for a 40 MHz channel corresponds to a size 128 IDFT and includes 128 tones, according to an embodiment. In an embodiment, the tones in an OFDM symbol include guard tones for filter ramp up and ramp down, DC tones for mitigating radio frequency interference, and pilot tones for frequency offset estimation. The remaining tones can be used to transmit data ("data tones"), according to an embodiment. More specifically, continuing with the same example, if a size 64 IDFT is used to generate an OFDM symbol, and seven tones are used as guard tones, one tone is used as a DC tone, four tones are used as pilot tones, the remaining 52 tones are then used as data tones. As another example, an OFDM symbol for an 80 MHz channel corresponds to a size 256 IDFT and may include 230 data tones according to an embodiment. In general, more tones are available for data transmission in higher bandwidth channels resulting in higher data rates generally associated with the wider bandwidths. Various example transmission channels and tone mappings that are utilized in some embodiments of the present disclosure are described in U.S. patent application Ser. No. 12/846,681, entitled "Methods and Apparatus for WLAN Transmission", filed on Jul. 29, 2010, which is hereby incorporated by reference herein in its entirety.

With reference to FIG. 2, a particular MCS defines the coding rate for the FEC encoders 212, the number of spatial streams created by the stream parser 216, and the number of constellation points used by the constellation mapper 224, in an embodiment. Generally, higher coding rates, more spatial streams, and larger constellations result in higher data rates. Conversely, a guard interval (e.g. inserted at unit 244 of FIG. 2) extends the symbol transmission time, thereby decreasing the data rate. A longer guard interval decreases throughput more than a shorter guard interval. As a specific example, in an embodiment, a data stream generated using 64-QAM modulation and ⅚ FEC coding rate, transmitted using 8 spatial streams in an 80 MHz channel with a long GI (0.8 µs) is transmitted at approximately 2.3 Gbps. The same data unit but with a short GI (0.4 µs) is transmitted at approximately 2.5 Gbps.

Referring again to FIG. 2, depending on the particular data rate, different numbers of encoders 212 operate in parallel in various embodiments and/or scenarios. For example, according to one embodiment, the PHY processing unit 200 includes four encoders 212, and one, two, three, or four encoders operate simultaneously depending on the particular MCS, bandwidth, and guard interval being utilized. In another embodiment, the PHY processing unit 200 includes five encoders 212, and one, two, three, four, or five encoders operate simultaneously depending on the particular MCS, bandwidth, and guard interval being utilized. In another embodiment, the PHY unit 200 includes up to ten encoders 212, and one, two, three, four, five, six, seven, eight, nine or ten encoders operate simultaneously depending on the particular MCS, bandwidth, and guard interval being utilized. In an embodiment, the number of encoders operating simultaneously increments at multiples of the data rate, e.g., every 600 Mbps. In other words, one encoder is utilized for data rates up to 600 Mbps, two encoders are utilized for data rates between 600 Mbps and 1200 Mbps, as an example. In an illustrative example, a data stream encoded with the coding rate of ¾, modulated using 256-QAM modulation (with 234 data tones), and transmitted on 4 spatial streams in an 80 MHz channel requires three encoders 212 to operate in parallel, in an embodiment.

As discussed above, the PHY processing unit 200 (FIG. 2) is utilized to encode and transmit data units, according to an embodiment. In some embodiments, the PHY processing unit 200 is also configured for receiving and decoding data units. The number of decoders utilized to decode a data stream generally corresponds to the number of encoders used to encode the data stream. Therefore, and AP (such as the AP 14) and/or a client station (such as the client station 25-1) generally includes an equal number of encoders and decoders. In some embodiments, however, the number of encoders is different than the number of decoders. In an embodiment, the number of decoders operating simultaneously increments at multiples of the data rate, e.g., every 600 Mbps. In other words, one decoder is utilized for data rates up to 600 Mbps, two decoders are utilized for data rates between 600 Mbps and 1200 Mbps, as an example. In an illustrative example, a data stream encoded with the coding rate of ¾, modulated using 256-QAM modulation (with 234 data tones), and transmitted on 4 spatial streams in an 80 MHz channel requires three decoders to operate in parallel, in an embodiment.

According to an embodiment, for a particular MCS and bandwidth, the number of encoders 212 (or decoders) that operate in parallel to encode (decode) a data stream is the same regardless of whether a short guard interval or a long guard interval is used to generate the symbols. According to another embodiment, for a particular MCS and bandwidth, more encoders (or decoders) are needed to encode (decode) a data stream with short guard intervals than a data stream with long guard intervals. For example, an MCS that defines a 64-QAM with 6 spatial streams encoded at the rate of ⅚ and transmitted in an 80 MHz channel corresponds to 1.725 Gbps data rate when a long guard interval of 0.8 μs is used, according to one embodiment. If the number of encoders (or decoders) increments at 600 Mbps, this data rate then requires three encoders (decoders) to be used in parallel. Continuing with the same example, in this embodiment, the data rate is approximately 1.9 Gbps when a short guard interval of 0.4 μs is used. In this case, four encoders (or decoders) need to operate in parallel to process the data unit. As just another example, a 80 MHz 64-QAM data stream with coding rate of ⅚ and 2 spatial streams requires one encoder (or decoder) when a long guard interval of 0.8 us is used, but two encoders (decoders) are needed for the same MCS and BW when a short guard interval of 0.4 μs is used. Consequently, certain MCSs are supported at the AP 14 and/or the client station 25-1 when a long guard interval is utilized, but are not supported at the AP 14 and/or the client station 25-1 when a short guard interval is utilized in various embodiments and/or scenarios.

In an embodiment, a client station such as client station 25-1, in establishing communication with the AP 14, signals to the AP 14 a highest data rate capability of the client station 25-1 based, at least in part, on the number of encoders available at the client station to process data streams. For example, in establishing communication with the AP 14, the client station 25-1 transmits an association frame to the AP 14, where the association frame includes an indicator of the highest data rate of the client station 25-1, according to one embodiment. The AP 14 then utilizes the indicator of the highest data rate of the client station 25-1 to determine whether an SGI or an LGI can be used with a particular MCS and/or a particular bandwidth when communicating with the client station 25-1, as will be described in more detail below. For example, when a particular MCS at a particular BW and with an SGI results in a data rate that exceeds the highest data rate of the client station 25-1, the AP 14 determines that SGI cannot be used with the particular MCS and the particular BW, in an embodiment.

In some embodiments, the client station 25-1 also receives an indication of a highest data rate capability of the AP 14 from the AP 14. The client station 25-2 then utilizes the indicator of the highest data rate of the AP 14 to determine whether an SGI or an LGI can be used with a particular MCS and/or a particular bandwidth when communicating with the AP 14. For example, when a particular MCS at a particular BW and with an SGI results in a data rate that exceeds the highest data rate of the AP 14, the client station 25-1 determines that SGI cannot be used with the particular MCS and the particular BW, in an embodiment.

Figure 4:
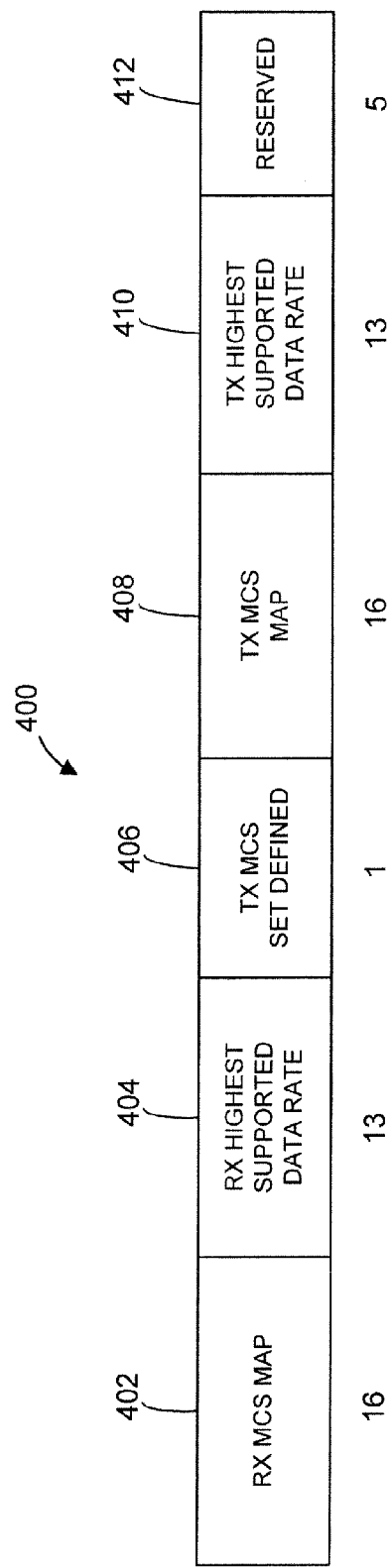
FIG. 4 is a diagram of a field included in an example data unit, according to an embodiment.

FIG. 4 is a diagram of a field 400 that is utilized by a first communication device to transmit to a second communication device an indication of a set of one or more MCSs supported by a first device and whether each of the one or more MCSs is supported when using the SGI, according to an embodiment. The field 400 is included in an association request frame that the client station 25-1 is configured to transmit to the AP 14, according to an embodiment. In other embodiments, the field 400 is included in one or more of a beacon, association request, association response, reassociation request, reassociation response, probe request, and probe response frames or any other initial capability inquiry and/or response frame that the station 25-1 is configured to transmit to the AP 14 or vice versa. In some embodiments, the field 400 is included in an initial capability inquiry and/or response frame that the AP 14 is configured to transmit to the client station 25-1 or vice versa. The field 400 includes an Rx MCS map subfield 402, and an Rx highest supported data rate subfield 404. According to an embodiment, the Rx MCS map subfield 402 indicates one or more supported MCS sets for one or more of a plurality of spatial streams to be received. For example, in an embodiment, one or more supported MCS sets is indicated for one or more of up to eight spatial streams to be received. In one such embodiment, if a particular device is only able to receive a subset of the eight spatial streams (e.g., if a device is only able to receive 1, 2, 3, or 4 of the 8 spatial streams), the device indicates, in the Rx MCS map subfield 402, a supported MCS set for each of the number of supported spatial streams, and also indicates that there is no support for the remaining numbers of spatial streams. The Rx highest supported data rate subfield 404 indicates a highest data rate that the device is capable of receiving.

Further, the field 400 includes a Tx MCS set defined subfield 406, a Tx MCS map subfield 408 and Tx highest supported data rate subfield 410. The Tx MCS set defined subfield 406 indicates whether the subfields 408 and 410 are valid. For example, when the Tx MCS set defined subfield 406 indicates the subfields 408 and 410 are not valid, a device receiving the field 400 determines that the device that transmitted the field 400 has transmission capabilities according to the subfields 402 and 404. When the Tx MCS set defined subfield 406 is appropriately set, the subfields 408 and 410 signal the MCS and data rate capabilities of the station for transmission. The field 400 also includes a reserved subfield 412.

In another embodiment, the station 25-1 communicates to the AP 14 in one or more of the association request, association response, reassociation request, reassociation response, probe request, probe response, or any other initial capability inquiry and/or response frame the maximum data rate that the client station 25-1 supports for reception and/or a number decoders of the client station 25-1, along with supported MCSs, enabling the AP 14 to determine the station's SGI capabilities for a particular MCS and/or a particular bandwidth. In yet another embodiment, the station 25-1 communicates to the AP 14 in one or more of the beacon, association request, association response, reassociation request, reassociation response, probe request, probe response, an indicator of supported MCSs for different bandwidths and guard interval lengths (SGI or LGI). In other words, for each supported MCS, the indicator may indicate whether the client station 25-1 supports that MCS with an SGI.

Figure 5:
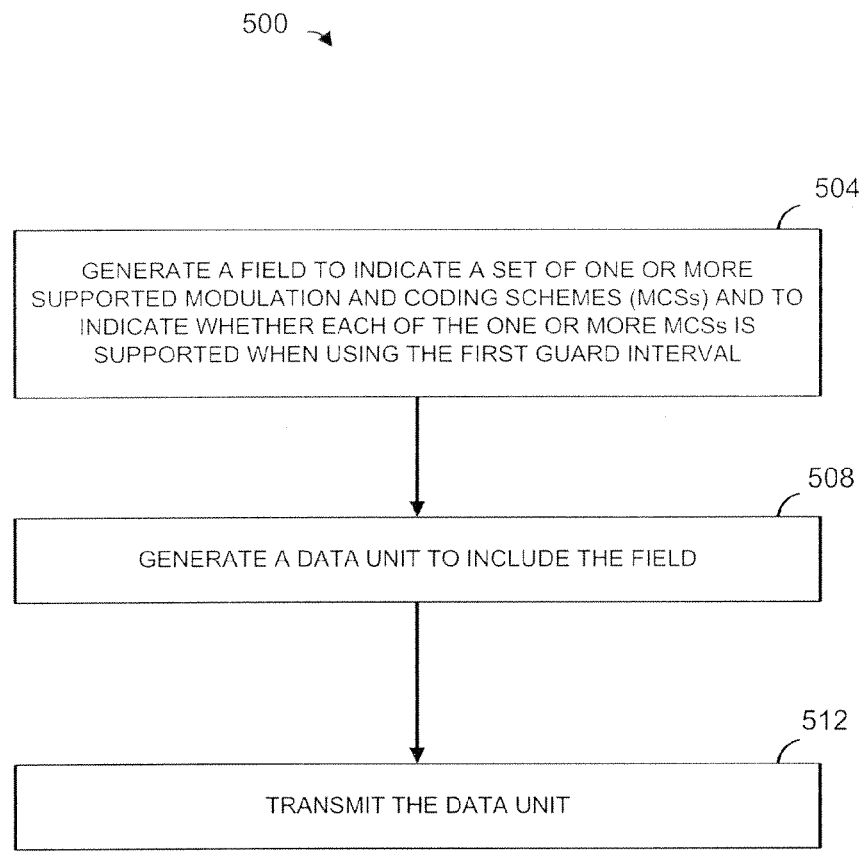
FIG. 5 is a flow diagram of an example method for generating a data unit to communicate capabilities with other communication devices in a wireless network, according to an embodiment.

FIG. 5 is a flow diagram of an example method 500 for generating a data unit that includes information to indicate transmission and/or reception capabilities for a communication device in a wireless network, according to an embodiment. With reference to FIG. 1, the method 500 is implemented by the network interface 16, in an embodiment. For example, in one such embodiment, the PHY processing unit 20 is configured to implement the method 500. According to another embodiment, the MAC processing 18 is also configured to implement at least a part of the method 500. With continued reference to FIG. 1, in yet another embodiment, the method 500 is implemented by the network interface 27 (e.g., the PHY processing unit 29 and/or the MAC processing unit 28). In other embodiments, the method 500 is implemented by other suitable network interfaces.

At block 504, a field is generated to indicate a set of one or more MCSs supported by the communication device (by which the method 500 is being implemented). The field also indicates whether each of the one or more MCSs is supported when using a first guard interval. For example, Rx MCS Map field 402 (FIG. 4) is generated to indicate supported MCSs and the RX Highest Supported Data Rate is generated to indicate whether each of the supported MCSs is supported by the communication device when a first guard interval (e.g., the SGI discussed above with reference to FIG. 3) is used. In an embodiment, the field is the field 400 of FIG. 4. In other embodiments, another suitable field is utilized.

At block 508, a data unit which includes the field is generated. At block 512 the data unit is transmitted to another device in the wireless network. For example, according to an embodiment, the data unit is transmitted to the AP 14 (FIG. 1) in an association request frame or another suitable data unit. In an embodiment, a processing unit causes the data unit to be transmitted, such as a PHY processing unit, a MAC processing unit, or another suitable processing unit.

FIG. 6 is a flow diagram of an example method 600 for determining capabilities of a communication device, according to an embodiment. With reference to FIG. 1, the method 600 is implemented by the network interface 16, in an embodiment. For example, in one such embodiment, the PHY processing unit 20 is configured to implement the method 600. According to another embodiment, the MAC processing 18 is also configured to implement at least a part of the method 600. With continued reference to FIG. 1, in yet another embodiment, the method 600 is implemented by the network interface 27 (e.g., the PHY processing unit 29 and/or the MAC processing unit 28). In other embodiments, the method 600 is implemented by other suitable network interfaces.

At block 604, a first communication device receives a data unit which includes capabilities information from a second communication device in a wireless network regarding capabilities of the second communication device. The capabilities information is a field such as the field 400 of FIG. 4 or another suitable field, according to an embodiment.

At block 608, the first communication device determines one or more MCS sets supported at the second communication device based on the information received at block 604. In an embodiment, a supported set is determined for each of a plurality of spatial streams.

At block 612, it is determined whether the one or more MCSs in the one or more of the supported MCS sets are supported at the second communication device when a first guard interval is utilized. In an embodiment, the guard interval support determination is made based on an indication of a highest supported data rate included in the data unit received at block 604 (e.g., in the Rx highest data rate subfield 404, FIG. 4). In an embodiment, the first guard interval is a short guard interval (e.g., the short guard interval discussed above with reference to FIG. 3).

At block 616, one of the supported MCSs is selected to be utilized when communicating with the second communication device.

At block 624, it is determined whether the first guard interval is supported for the selected MCS. If it is determined at block 624 that the first guard interval is supported for the selected MCS, then the first guard interval is utilized when communicating with the second communication device at block 628. On the other hand, if it is determined at block 624 that the first guard interval is not supported for the selected MCS, then a second guard interval (e.g., the long guard interval discussed above with reference to FIG. 3) is utilized when communicating with the second communication device at block 628 at block 632.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal"

means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for generating a data unit for transmission in a wireless network, wherein communication devices in the wireless network are configured to use a first guard interval between symbols or a second guard interval between symbols, wherein the first guard interval has a length shorter than a length of the second guard interval, the method comprising:
   generating a field to indicate a set of two or more modulation and coding schemes (MCSs) supported by a first device in the wireless network and to indicate whether each of the two or more MCSs is supported when using the first guard interval, including:
   generating a first subfield of the field to indicate MCSs supported by the first device for different numbers of spatial streams, and
   generating a second subfield of the field to indicate a highest supported data rate,
   wherein the highest supported data rate indicates whether each of the two or more MCSs is supported when using the first guard interval;
   generating a data unit to include the field; and
   causing the data unit to be transmitted to a second device in the wireless network.

2. A method according to claim 1, wherein: the first subfield indicates MCSs for receiving supported by the first device, the second subfield indicates a highest data rate for receiving supported by the first device, generating the field further comprises i) generating a third subfield of the field to indicate a set of two or more MCSs for transmitting supported by the first device, and ii) generating a fourth subfield of the field to indicate whether each of the two or more MCSs for transmitting is supported when using the first guard interval.

3. An apparatus for use in a wireless network, wherein the wireless network is configured to use a first guard interval between symbols or a second guard interval between symbols, wherein the first guard interval has a length shorter than a length of the second guard interval, the apparatus comprising:
   a wireless network interface configured to generate a field to indicate a set of two or more modulation and coding schemes (MCSs) supported by the wireless network interface and to indicate whether each of the two or more MCSs is supported when using the first guard interval, including:
   generating a first subfield of the field to indicate MCSs supported by the wireless network interface for different numbers of spatial streams, and
   generating a second subfield of the field to indicate a highest supported data rate,
   wherein the highest supported data rate indicates whether each of the two or more MCSs is supported when using the first guard interval;
   wherein wireless network interface is further configured to generate a data unit to include the field, and
   cause the data unit to be transmitted to another device in the wireless network.

4. An apparatus according to claim 3, wherein: the first subfield indicates MCSs for receiving supported by the wireless network interface; the second subfield indicates a highest data rate for receiving supported by the wireless network interface; and the wireless network interface is configured to generate a third subfield of the field to indicate a set of two or more MCSs for transmitting supported by the wireless network interface, and generate a fourth subfield of the field to indicate whether each of the two or more MCSs for transmitting is supported when using the first guard interval.

* * * * *